United States Patent [19]

Lee

[11] Patent Number: 5,635,984
[45] Date of Patent: Jun. 3, 1997

[54] MULTI-PICTURE CONTROL CIRCUIT AND METHOD FOR ELECTRONIC STILL CAMERA

[75] Inventor: Young-man Lee, Kyunggi-do, Rep. of Korea

[73] Assignee: SamSung Electronics Co., Ltd., Kyungki-do, Rep. of Korea

[21] Appl. No.: 527,385

[22] Filed: Sep. 13, 1995

Related U.S. Application Data

[63] Continuation of Ser. No. 804,727, Dec. 11, 1991, abandoned.

[51] Int. Cl.$^6$ .................................................. H04N 5/222
[52] U.S. Cl. ........................ 348/333; 348/564; 348/588; 345/200
[58] Field of Search .................................. 348/564, 584, 348/565, 566, 567, 568, 333, 588, 207; 358/409; 345/118, 200; 395/163, 116

[56] References Cited

U.S. PATENT DOCUMENTS 4,680,643  7/1987  Horiguchi .......................... 358/409
5,109,395  4/1992  Tanaka ............................. 377/44
5,161,012  11/1992  Choi ............................... 348/564

*Primary Examiner*—Wendy Garber
*Assistant Examiner*—Andrew B. Christensen
*Attorney, Agent, or Firm*—Robert E. Bushnell, Esq.

[57] ABSTRACT

In an electronic still camera which digitizes a video signal to store it in a memory and displays the signal by reproducing means, a multi-picture control circuit and method for an electronic still camera are disclosed. The circuit comprises a picture selector for inputting a picture to be displayed or a detecting completion instruction, a microcomputer for inputting an instruction from the picture selector to perform a predetermined control, and a multi-picture controller for generating a read address of one picture or multiple pictures written in a main memory under the control of the microcomputer. The circuit and method are capable of displaying more than one picture onto the picture display at a time, thereby reducing the time required to detect more than one picture's worth of data written in the main memory of an electronic still camera.

37 Claims, 12 Drawing Sheets

FIG. 2 (PRIOR ART)

| | PAGE ADDRESS | DATA ADDRESS | |
|---|---|---|---|
| 1st PICTURE | 0 | 0000 / FFFF | START / END |
| 2nd PICTURE | 1 | 0000 / FFFF | START / END |
| 3rd PICTURE | 2 | 0000 / FFFF | START / END |
| 4th PICTURE | 3 | 0000 / FFFF | START / END |
| 5th PICTURE | 4 | 0000 / FFFF | |
| 6th PICTURE | 5 | 0000 / FFFF | |
| 7th PICTURE | 6 | 0000 / FFFF | |
| 8th PICTURE | 7 | 0000 / FFFF | |
| 9th PICTURE | 8 | 0000 / FFFF | |
| 10th PICTURE | 9 | 0000 / FFFF | |
| 11th PICTURE | A | 0000 / FFFF | |
| 12th PICTURE | B | 0000 / FFFF | |
| 13th PICTURE | C | 0000 / FFFF | |
| 14th PICTURE | D | 0000 / FFFF | |
| 15th PICTURE | E | 0000 / FFFF | |
| 16th PICTURE | F | 0000 / FFFF | START / END |

MSB ← MAIN MEMORY ADDRESS → LSB

00H — FFH (HORIZONTAL ADDRESS)
00V — FFV (VERTICAL ADDRESS)

MAIN MEMORY ADDRESS = PAGE ADDRESS + VERTICAL ADDRESS + HORIZONTAL ADDRESS

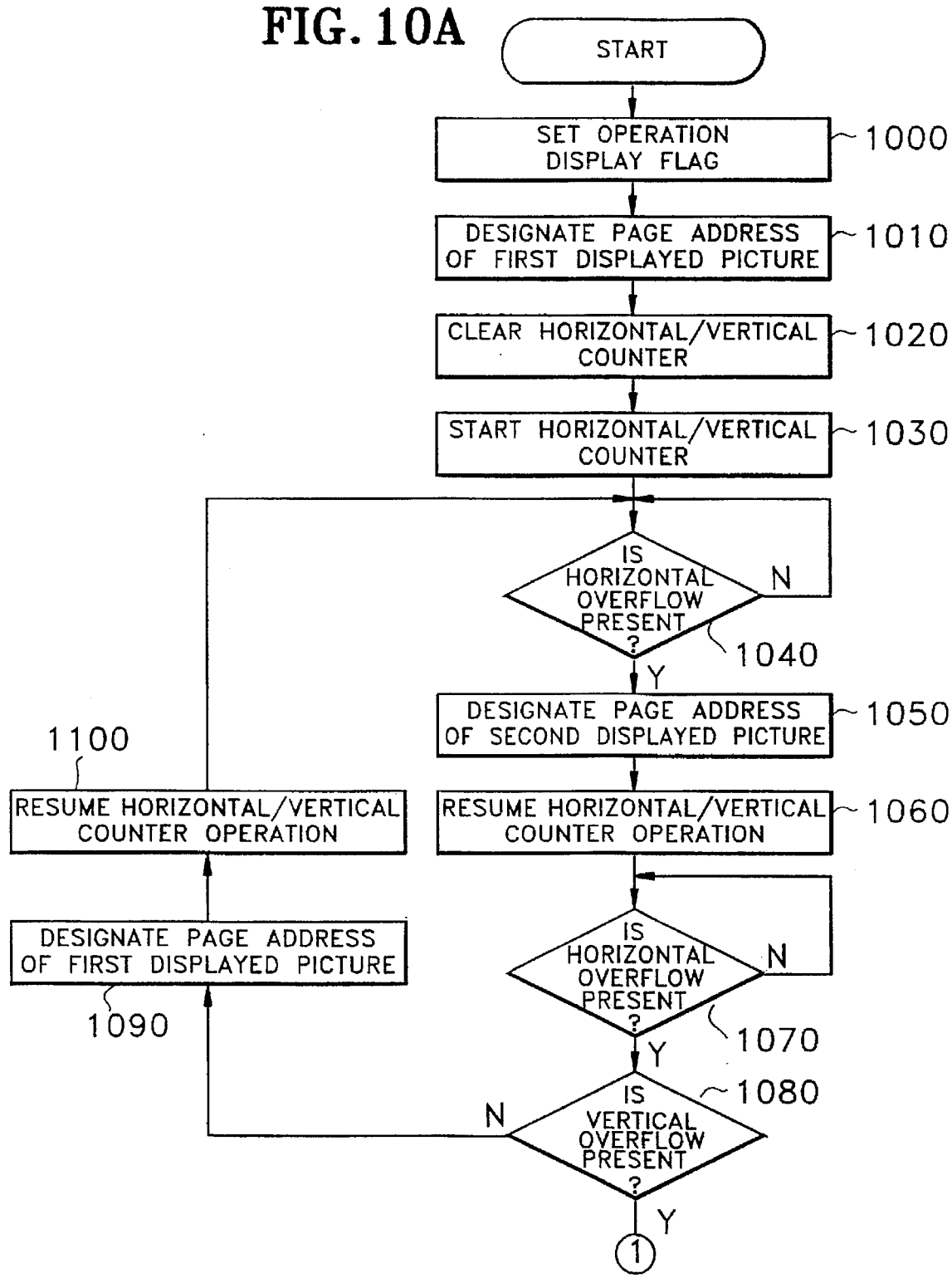

MULTI-PICTURE CONTROL CIRCUIT AND METHOD FOR ELECTRONIC STILL CAMERA

This is a continuation of application Ser. No. 07/804,727, filed 11 Dec. 1991, now abandoned.

BACKGROUND OF THE INVENTION

The present invention relates to a circuit an method for reading out picture data written in a main memory and displaying the data on a picture display in an electronic still camera, and more particularly to a multi-picture control circuit and method for accessing pictures written in a main memory and displaying them individually or in groups of more than one at a time.

Generally, in an electronic still camera, a video signal photoelectrically converted by a photoelectric converting device such as a charge-coupled device (CCD), is converted to digital video data by an analog to digital (A/D) converter and is written on a writing medium by frames. The video data written on a writing medium may be erased for other video data or may be stored in another writing medium. A buffer memory performs the former function and a main memory performs the latter function. To write/store a lot of video data, a capacity of main memory is usually set to be far greater than the buffer memory capacity. The video data written in a main memory may be processed by a data processor such as a microcomputer and may be provided for another object such as copying, transmission or reproduction. To see the contents of video data written in a main memory, the video data copied in another buffer memory (buffer memory for reproduction), is sequentially read out, converted to an analog composite video signal by a digital-to-analog (D/A) converter, and displayed on a display apparatus such as a monitor incorporated in an electronic still camera.

FIG. 1 is a block diagram of a circuit for displaying pictures written in a conventional electronic still camera. A video signal from a video input portion 1 is converted to digital video data in an A/D converter 2 and is written by frames in a buffer memory 3. Video data written in the buffer memory 3 may be erased to allow for the writing of additional data in the buffer memory 3, or may be stored in a main memory 4. Main memory 4 can store more than one picture's worth of data. For efficient control of written picture data, each picture's worth of data is written in a page whose writing region is the same as or greater than a writing region for writing one picture of data. Thus, different pages have different pictures of data. In other words, a microcomputer can control written video data by pages regardless of the contents. FIG. 2 illustrates the address designation of pictures of data in the main memory 4 of FIG. 1. Here, the size of one frame is 256 bytes×256 bytes and the number of pages is 16. The picture data for one page is divided into horizontal and vertical components. The horizontal component corresponds to horizontal addresses of the picture data and the vertical component corresponds to vertical addresses thereof. For better resolution, through the use of one field capacity by nonsequential scanning, the size of one frame can be 512 bytes×512 bytes. If a main memory with this capacity is used, the number of pages becomes 4. Picture data written in each region of main memory 4 can be checked via a picture display 7 of FIG. 1, erased for writing another picture, or moved to another region in main memory. Microcomputer 9 controls main memory 4. To check the written picture data via the picture display, a page is selected from among pages of main memory 4 to read out picture data from the selected page, and writes the read out picture data into a reproducing frame buffer. Picture data written in reproducing buffer memory 5 is read out, corresponding to horizontal and vertical periods suitable for picture display 7, then is converted to analog data by D/A converter 6 to be displayed on picture display 7. Since the picture data written in main memory 4 is read out by pages and written in reproducing buffer memory 5, the conventional electronic still camera is disadvantageous in that the above operation must be repeated as required, or a certain picture region must be particularly designated, in order for a user to see more than one picture.

SUMMARY OF THE INVENTION

Therefore, it is an object of the present invention to provide a circuit for designating one or more picture's worth of data written in a main memory and simultaneously displaying the designated picture data.

It is another object of the present invention to provide a method for designating one or more picture's worth of data written in a math memory and simultaneously displaying the designated picture data.

To attain the objects, the multi-picture control circuit for an electronic still camera comprises:
- a picture selector for receiving a user's picture selecting instruction;
- a microcomputer for performing a control operation for displaying one or more frames of picture data on a picture display according to the picture selecting instruction input from the picture selector; and
- a multi-picture controller for realizing various picture states under the control of the microcomputer.

In controlling the multi-picture reproducing circuit, the multi-picture controlling method for an electronic still camera comprises the steps of:
- operating as a normal mode if a detecting mode is not designated, and interrupting the output from a reproducing buffer memory to a picture display if the detecting mode is designated;
- controlling a multi-picture controller by a microcomputer according to an instruction of the picture selector and reading out picture data of the main memory to write it into the reproducing buffer memory;
- resuming the output from the reproducing buffer memory to the picture display after the completion of the writing step;
- waiting for an instruction from the picture selector after the output step; and
- erasing a currently displayed picture when receiving a completion signal in the previous step, and reproducing a picture which was displayed before the detecting step, and returning to a normal mode.

BRIEF DESCRIPTION OF THE DRAWINGS

The above objects and other advantages of the present invention will become more apparent by describing in detail a preferred embodiment of the present invention with reference to the attached drawings in which:

FIG. 2 illustrates divided picture regions in the main memory shown in FIG. 1;

FIGS. 10A and 10B show an embodiment of the four-picture displaying routine shown in FIG. 7.

DETAILED DESCRIPTION OF THE INVENTION

Figure 1:
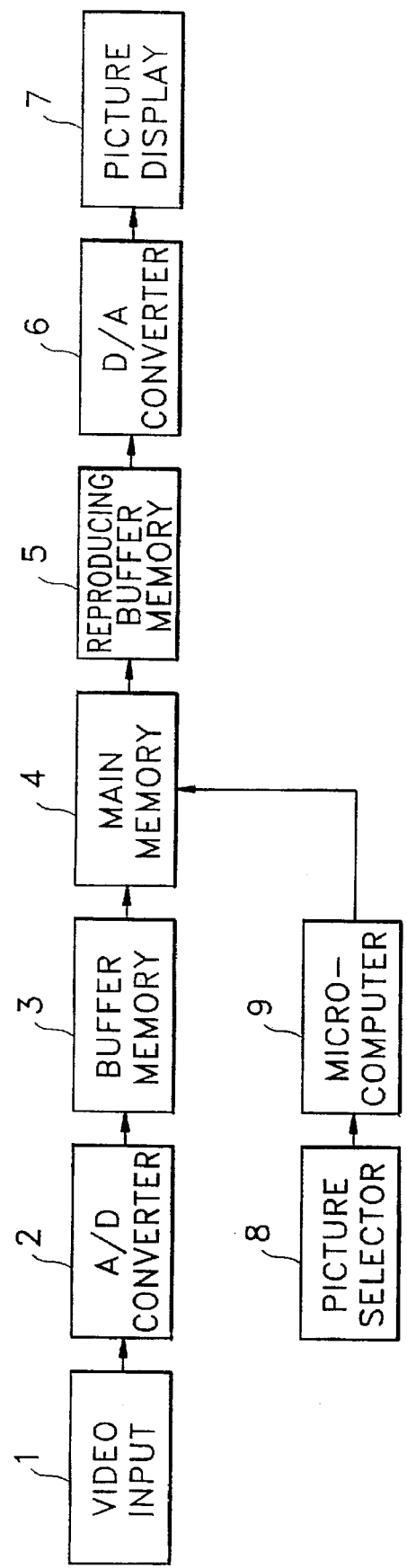
FIG. 1 is a block diagram of a picture displaying circuit for a conventional electronic still camera.
Figure 3:
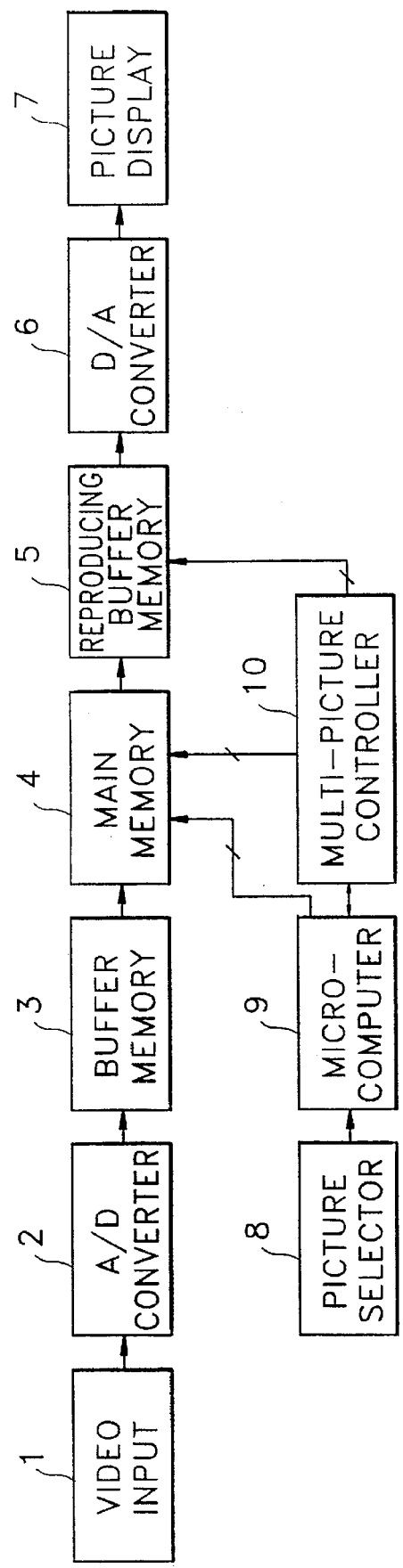
FIG. 3 is a block diagram of a multi-picture display circuit of the present invention.

Referring to FIG. 3, a multi-picture displaying circuit of the present invention comprises a video input 1 for producing an analog video signal from an object to be pictured, an A/D converter 2 for converting the analog video signal to digital video data, a buffer memory 3 for writing the digital video data by frames, a main memory 4 for writing/storing picture data of buffer memory 3, a reproducing buffer memory 5 for storing picture data read out from main memory 4 in the unit of frames, a D/A converter 6 for converting digital video data read out from reproducing buffer memory 5 to an analog video signal, a picture display 7 for displaying the analog video signal on a screen, a picture selector 8 for selecting a picture which is to be displayed on picture display 7, a microcomputer 9 for performing operational control according to a picture selecting instruction input from the picture selector 8, and a multi-picture controller 10 for generating a read address for producing each picture state under the control of the microcomputer 9.

Including a means for designating a detecting mode and a means for designating the page of a picture to be reproduced, picture selector 8 inputs a user's instruction of selecting a detecting mode. In order to perform a control operation for realizing a reproduced picture in reproducing buffer memory 5 by receiving an instruction from picture selector 8, microcomputer 9 designates a page address for the picture data written in main memory 4 and controls the operation of multi-picture controller 10. Including a multiplexer, address generators, a horizontal and vertical counter and a flip-flop, under the control of microcomputer 9, multi-picture controller 10 generates a read address in a page designated by microcomputer 9.

Figure 4:
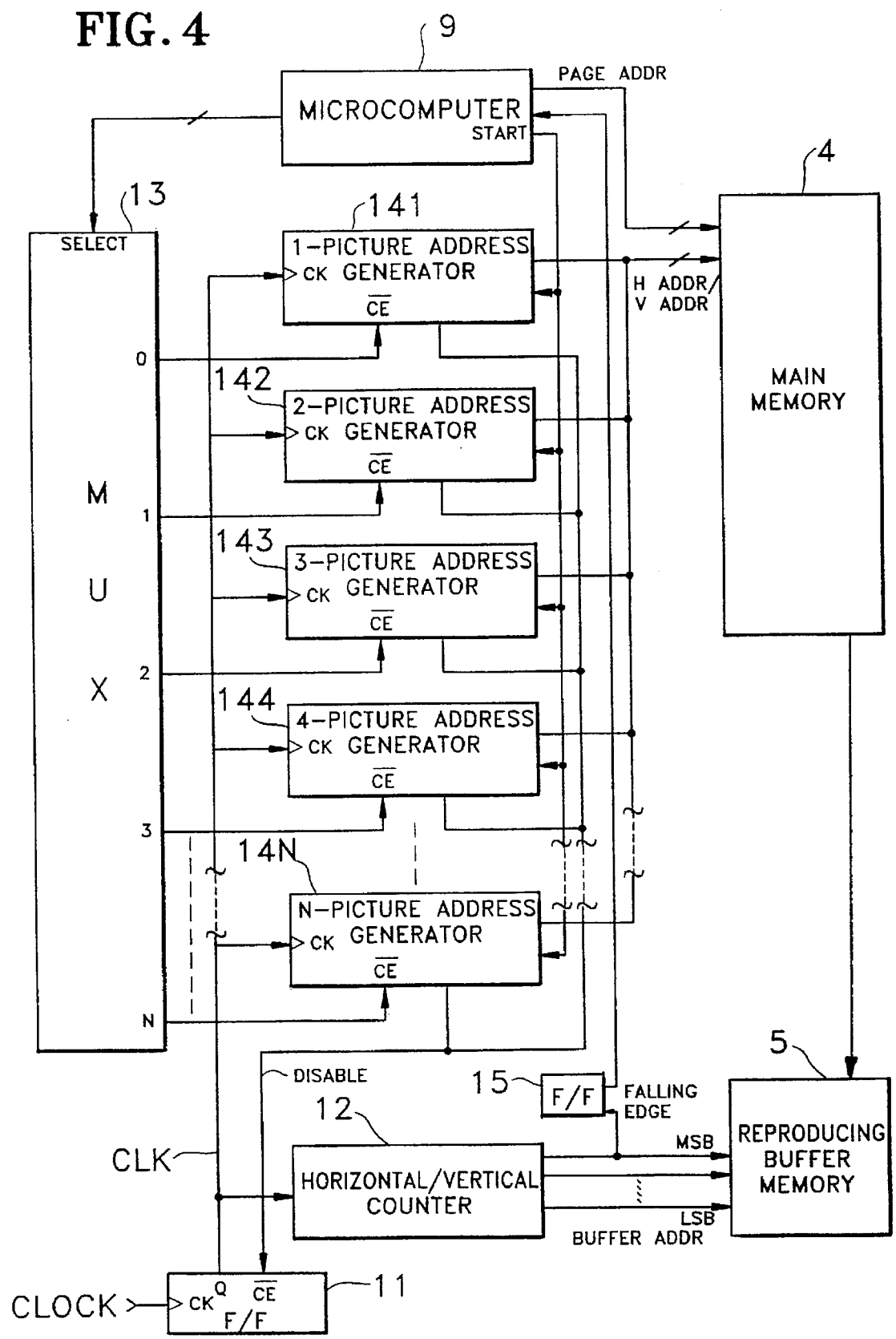
FIG. 4 is a block diagram of the multi-picture controller shown in FIG. 3 and includes the main memory, reproducing buffer memory, and microcomputer of FIG. 3.

Referring to FIG. 4, multi-picture controller 10 comprises a plurality of N-picture address generators 141, 142, 143, 144 . . . , 14N, a multiplexer 13 for selectively outputting the outputs of the N-picture address generator and supplying the output to main memory 4, a horizontal and vertical counter 12 for generating horizontal and vertical addresses of the reproducing buffer memory 5, a horizontal and vertical overflow detector 15 for detecting an overflow of horizontal and vertical counter 12, and a flip-flop 11 for controlling a clock input to the horizontal and vertical counter. The horizontal and vertical counter 12 designates addresses for reproducing buffer memory 5 and makes the process of designating an address of reproducing buffer memory 5 synchronized with the process of designating an address of picture of data in main memory 1.

Figure 5:
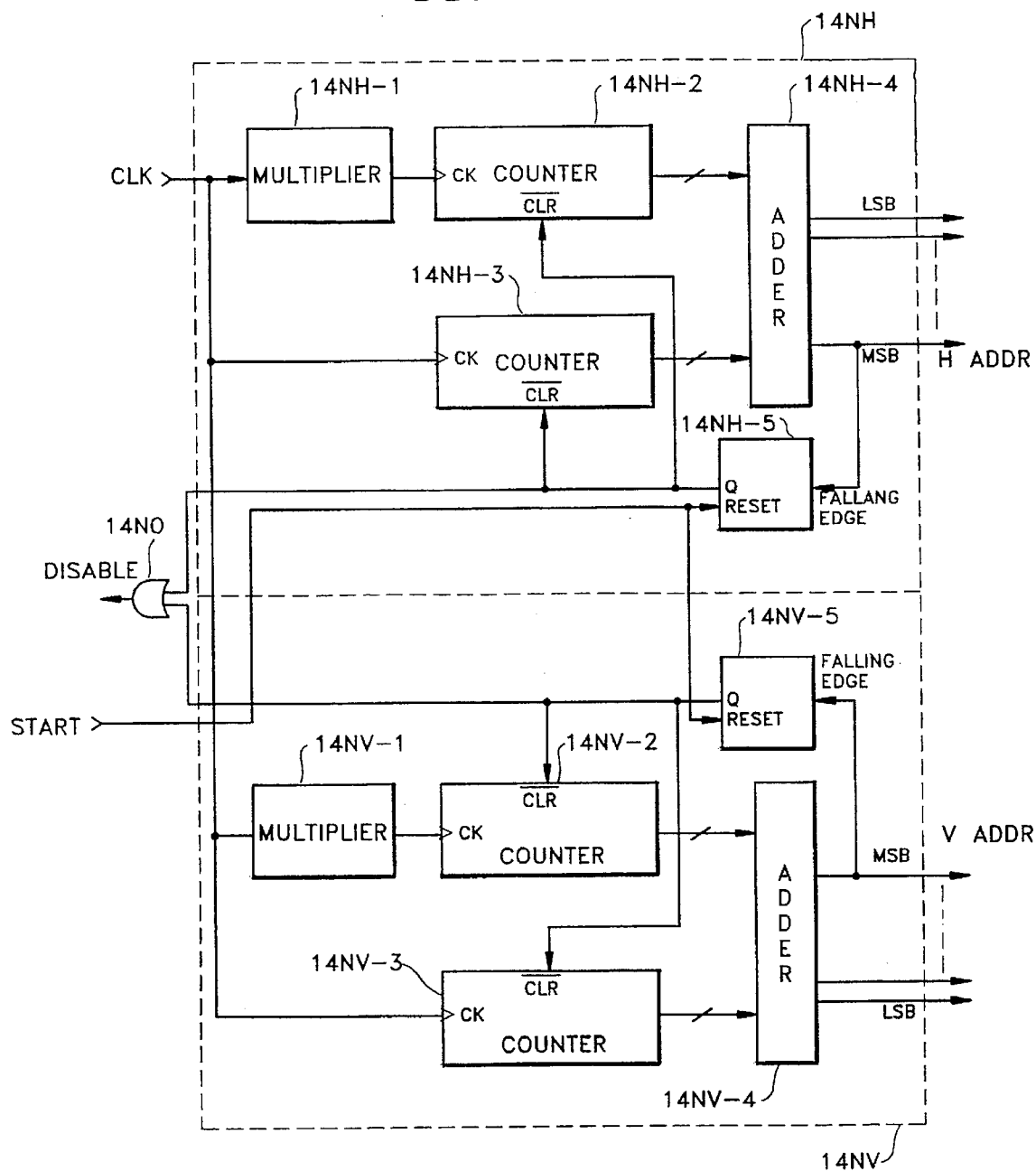
FIG. 5 is an embodiment of one multi-picture display address generator shown in FIG. 4.

Referring to FIG. 5, to count a predetermined interval in the horizontal and vertical directions, each of the N-picture address generators 141, 142, 143, 144, . . . , 14N of FIG. 4 comprises a horizontal address generator 14NH, a vertical address generator 14NV, and an OR gate 14N0. The horizontal address generator 14NH comprises a first counter 14NH-2 for providing an even-numbered multiple of the input clock, a second counter 14NH-3 for providing an integer value times the input clock, a multiplier 14NH-1 which is connected to the first counter, a first adder 14NH-4 for adding the outputs of the first and second counters, a horizontal overflow detector 14NH-5 for detecting the overflow of the adder's output. The vertical address generator 14NV comprises a third counter 14NV-2 for providing an even-numbered multiple of the input clock, a fourth counter 14NV-3 for providing integer value times the input clock, a second multiplier 14NV-1 which is connected to the third counter, an adder 14NV-4 for adding the outputs of the third and fourth counters, and an overflow detector 14NV-5 for detecting the overflow of the adder's output. The outputs of the horizontal and vertical overflow detectors 14NH-5 and 14NV-5 are OR-gated in OR gate 14N0. In displaying more than one picture on the picture display 7, picture data of main memory 4 must be compressed. The compression method used in the present invention is to read out the picture data written in main memory 4 while skipping predetermined horizontal and vertical lines which are set according to the number of pictures to be displayed. This requires horizontal and vertical address generators. In order to provide a horizontally and vertically sub-divided picture, the horizontal and vertical address generators count an input clock by an integer (1, 2, 3 . . . , n). The present invention includes a first counter for counting the clock by an even number and a second counter for counting the clock by an integer. A count value of any multiple can be obtained by adding together the outputs of the first and second counters. Counting the even numbered value is performed by multiplying the received clock by an even number multiplier and supplying the multiplied clock frequency to a counter.

Figure 11A:
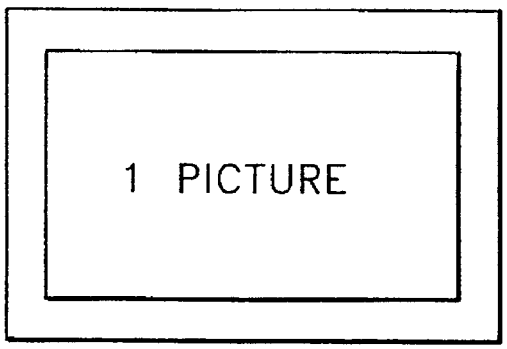
FIGS. 11A through 11F show the states of a picture displayed according to the present invention.
Figure 11B:
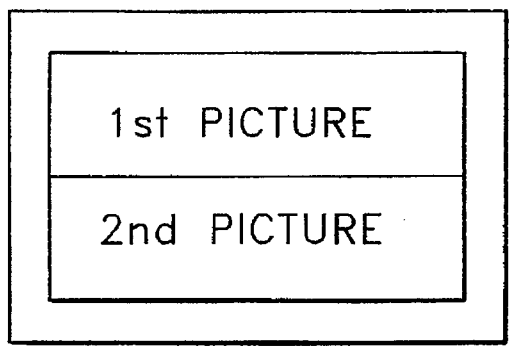
Figure 11C:
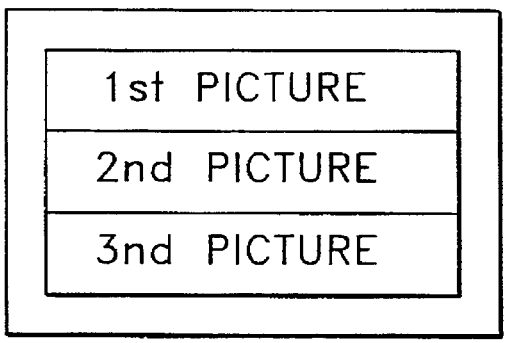
Figure 11D:
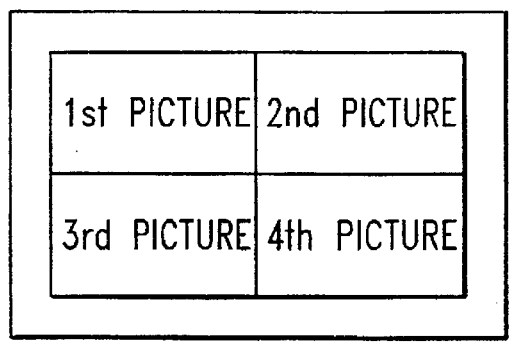
Figure 11E:
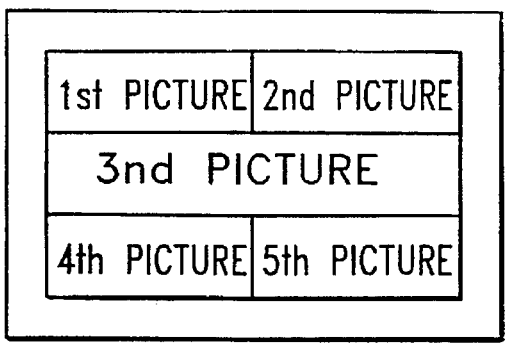
Figure 11F:
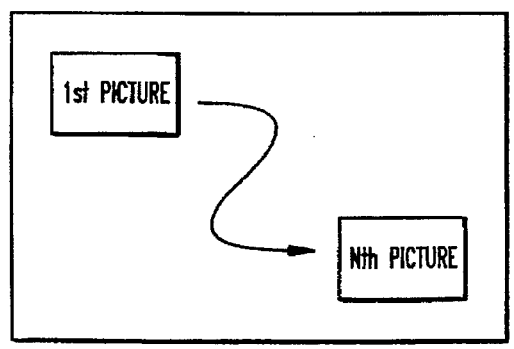

Now, for example, the reading out of picture data in the main memory 4 will be described in the case of detecting four picture data as shown in FIG. 11d. The first horizontal line of the first picture data is read out every other pixel in the horizontal direction according to the aforementioned picture data compression method. Subsequently, the first horizontal line of the second picture data is read out according to the same method as above. The read out picture data is written in the horizontal line of the first frame of the reproducing buffer memory 5. After the completion of writing the first horizontal line of the reproducing buffer memory 5, the vertical address of reproducing buffer memory 5 increases by "one". A horizontal line of the first and second picture data in main memory 4 is hopped by one and a third horizontal line will be read out according to the same method as above. In order to designate each page address whenever picture data to be read out from main memory 4 is changed, the microcomputer 9 senses the completion of the horizontal and vertical reading of each picture of data. Whether or not the reading of the horizontal or vertical components of this data is completed is determined by inspecting the most significant bit (MSB) of each address supplied from the horizontal address generator 144H and vertical address generator 144V of the four-picture address generator 144 to the address bus of main memory 4 in order to detect the falling edge of the MSB. Overflow detection is carried out in horizontal or vertical overflow detector 144H-5 or 144V-5. The detected overflow signal is sensed by microcomputer 9 which then supplies the page address of the picture's data to an address bus of main memory 4. While microcomputer 9 supplies this page address, in order to stop horizontal and vertical counter 12 of reproducing buffer memory 5, the above-mentioned overflow signal is supplied as a disable signal for a D flip-flop 11 which is connected to the input of the horizontal and vertical counter through OR gate 14N0. After supplying the page address of the second picture to main memory 4, microcomputer 9 produces a start signal to clear D flip-flops within overflow detectors 14NH-5 and 144V-5. The start signal from microcomputer 9 also clears D flip-flop 11 (which has interrupted the clock input to horizontal and vertical counter 12), enabling the flip-flop to supply the clock again which restarts the operation of horizontal and vertical counter 12. Simultaneously, horizontal and vertical address generators 144H and 144V of four-picture address generator 144 begin to operate again. When the vertical overflow signal is generated which indicates the completion of the reading out of the picture data for the designated page, microcomputer 9 supplies the page address of a next picture data The subsequent operation is the same as the reading of the previous picture of data. An overflow signal which is generated from an overflow detector 15 connected to the MSB of the address signal output from horizontal and vertical counter 12, indicates the end of operation of the four-picture address generator and the end of writing in reproducing buffer memory 5. The overflow signal is then supplied to microcomputer 9.

Figure 6:
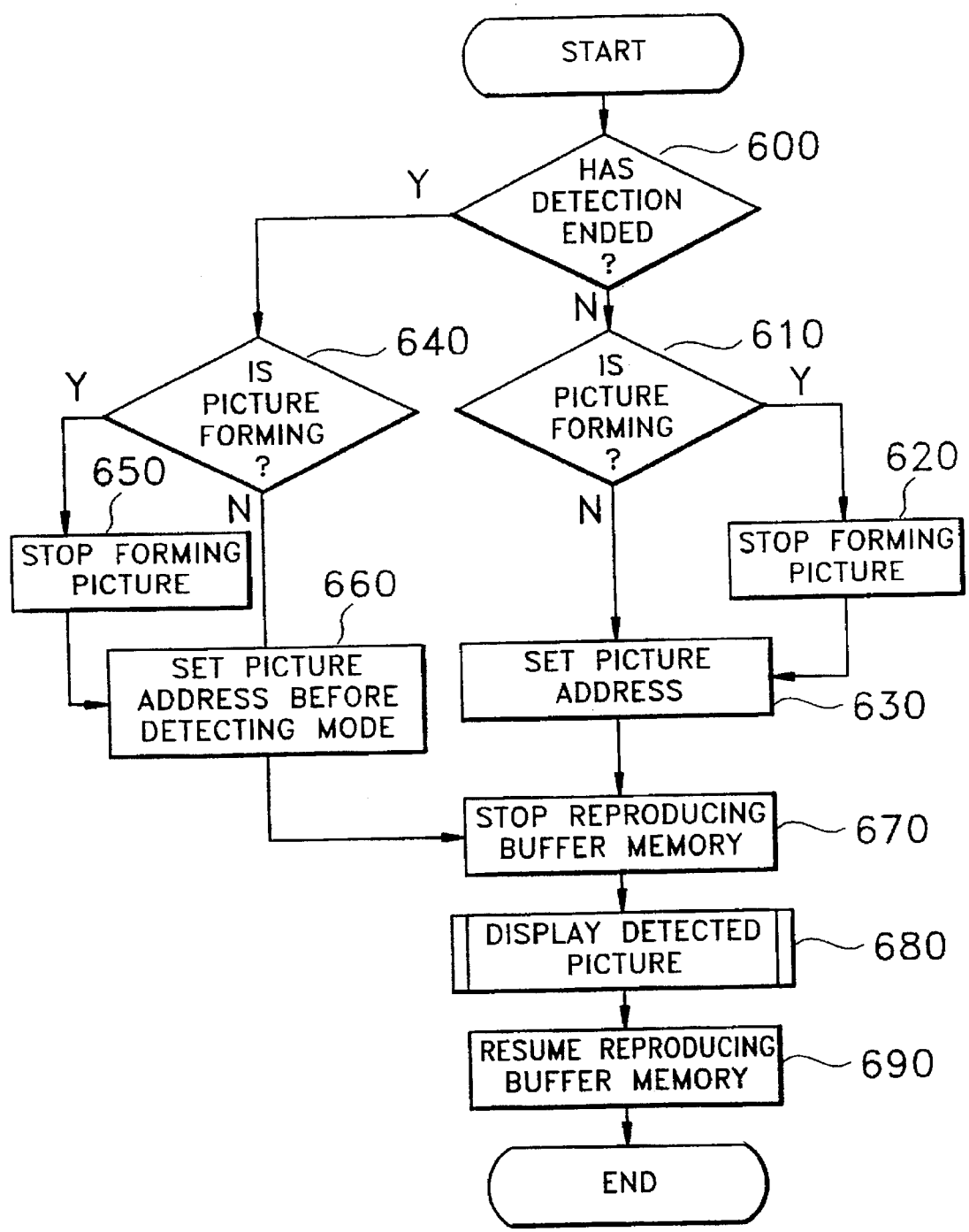
FIG. 6 is a flowchart of a multi-picture controlling method of the present invention.

FIG. 6 is a flowchart of a multipicture controlling method of the present invention. During normal mode if designated by picture selector 8, a detecting mode is performed. Referring to FIG. 6, first, step 600 inspects whether or not an instruction from picture selector 8 is a end-of-detection instruction. If it is not a detection end instruction, step 610 checks whether or not picture formation is performed by the previous detecting mode. If picture data is being written in reproducing buffer memory 5 according to a particular multi-picture control routine, step 620 stops the writing into the reproducing buffer memory according to the multi-picture control routine, allowing the writing of the newly-designated multi-picture. A signal input from picture selector 8 to microcomputer 9 during the detecting mode represents a page number to be indicated or the end of the detection mode. In step 630, microcomputer 9 converts the number of pages to be displayed into a page address and stores it. If the page address of a picture of data to be displayed is provided, step 670 interrupts the output to picture display 7 to perform the multi-picture control routine. Step 680 stores the picture data to be displayed into reproducing buffer memory 5. In step 690 after the completion of writing into the reproducing buffer memory 5, output to picture display 7 is resumed so that the picture data written in the reproducing buffer memory 5 is displayed on picture display 7. Meanwhile, if in step 600, the instruction from picture selector 8 is an end-of-detection instruction, then step 640 checks whether or not the writing into reproducing buffer memory 5 is performed according to multi-picture controller 10. If writing is being performed in step 640, step 650 interrupts the writing. Step 660 provides the page address of the picture data to display the picture which was displayed before the reproduced picture. After step 660, the reproducing operation is carried out as in steps 670-690.

Figure 7:
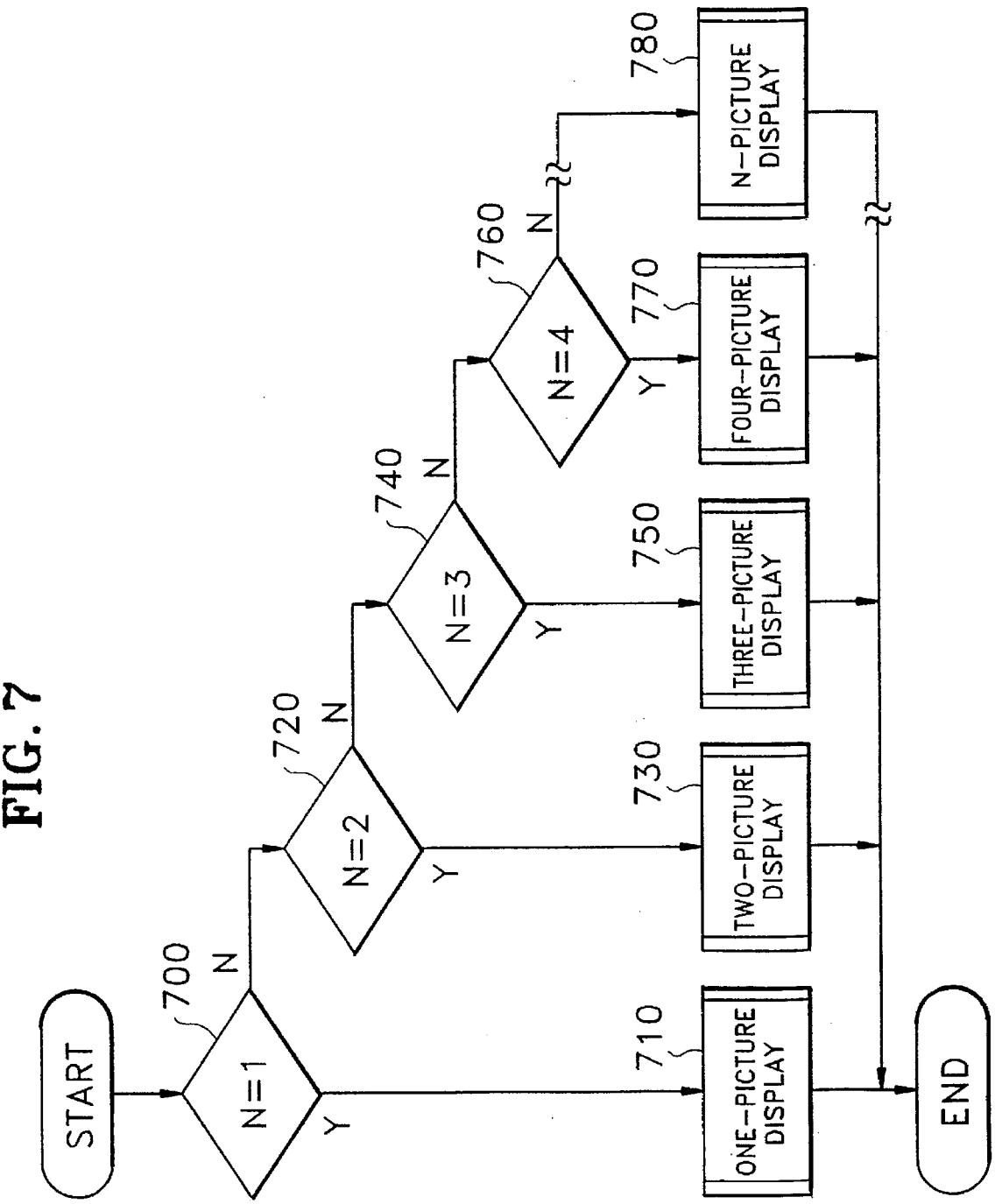
FIG. 7 is a flowchart illustrating an embodiment of the detected picture displaying routine shown in FIG. 6.

Referring to FIG. 7, the number of pictures to be displayed is determined to be ramified into respective N-picture control routines (steps 700-790).

Figure 8:
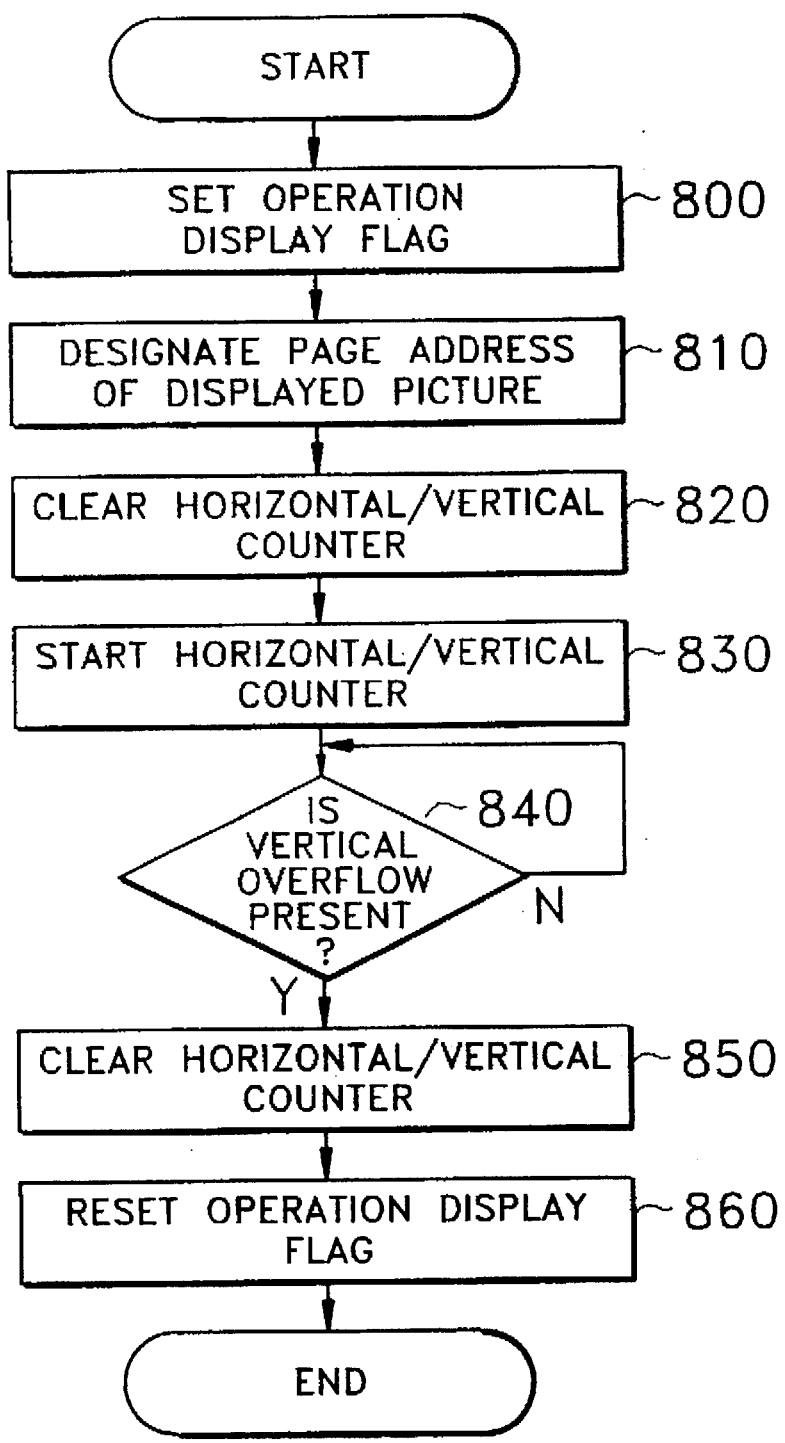
FIG. 8 is a flowchart illustrating an embodiment of the one-picture displaying routine shown in FIG. 7.

Referring to FIG. 8, step 800 sets an operation display flag which indicates that reproducing buffer memory 5 is writing according to multi-picture controller 10. The flag is used when microcomputer 9 checks to see whether multi-picture controller 10 is operating or not. Step 810 supplies the page address of a designated picture of data to the address bus of main memory 4. Step 820 resets horizontal and vertical counter 12 to initialize it. After operating horizontal and vertical counter 12, step 830 starts the reading out from main memory 4 and writes into reproducing buffer memory 5. Step 840 checks for the absence or presence of a completion signal from horizontal and vertical counter 12, thereby waiting for the write operation to be completed. After the completion of writing, an operation indicating flag is reset to end the one-picture control routine in steps 850 and 860.

Figure 9:
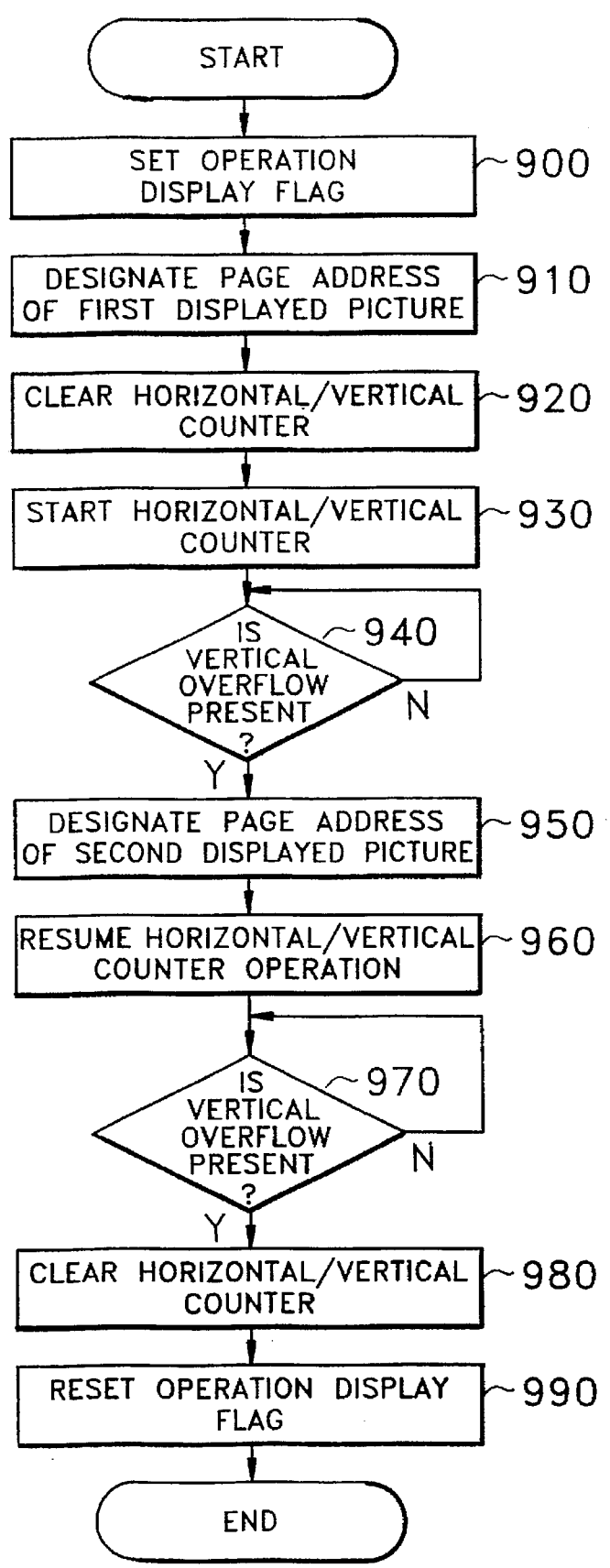
FIG. 9 is a flowchart illustrating an embodiment of the two-picture displaying routine shown in FIG. 7.

Referring to FIG. 9, when displaying two pictures on one screen, since the reproducing buffer memory region is vertically divided into two halves, vertical compression of picture data is required. Vertical compression of the picture data is carried out by vertically reading out every other horizontal line in main memory 4, resulting in 2:1 compression.

Vertical address generator 142NV of two-picture address generator 142 supplies as a vertical address of picture data in main memory 4, a value which is two times the vertical address of the reproducing buffer memory designated by horizontal and vertical counter 12. The completion of writing the upper picture is recognized by detecting the falling edge of the MSB in vertical address generator 142V of the two-picture address generator. When an overflow signal is generated in vertical address generator 142V, microcomputer 9 supplies the page address of the second picture's data to the address bus of main memory 4 to read and write the second picture's data.

First, in step 900, multi-picture controller 12 sets a writing flag in reproducing buffer memory 5. The flag is used when microcomputer 9 decides whether or not multi-picture controller 10 is operating. Step 910 supplies the page address of a designated picture's data to the address bus of main memory 4. To initialize the operation of horizontal and vertical counter 12, step 920 clears horizontal and vertical counter 12. Step 930 starts the reading out from main memory 4 and then the writing of the data into reproducing buffer memory 5 by operating horizontal and vertical counter 12. Step 940 checks for a vertical overflow signal, waiting for the completion of the writing of the first picture's data. After completion, step 950 supplies the page address of the second picture to the address bus of main memory 4. Step 960 restarts horizontal and vertical counter 12 to restart the reading out of main memory 4 and writing of reproducing buffer memory 5. Step 970 checks for the completion signal from horizontal and vertical counter 12, waiting for the completion in the writing of reproducing buffer memory 5, after which an operation display flag is reset to end the two-picture display routine in steps 980 and 990.

Figure 10B:
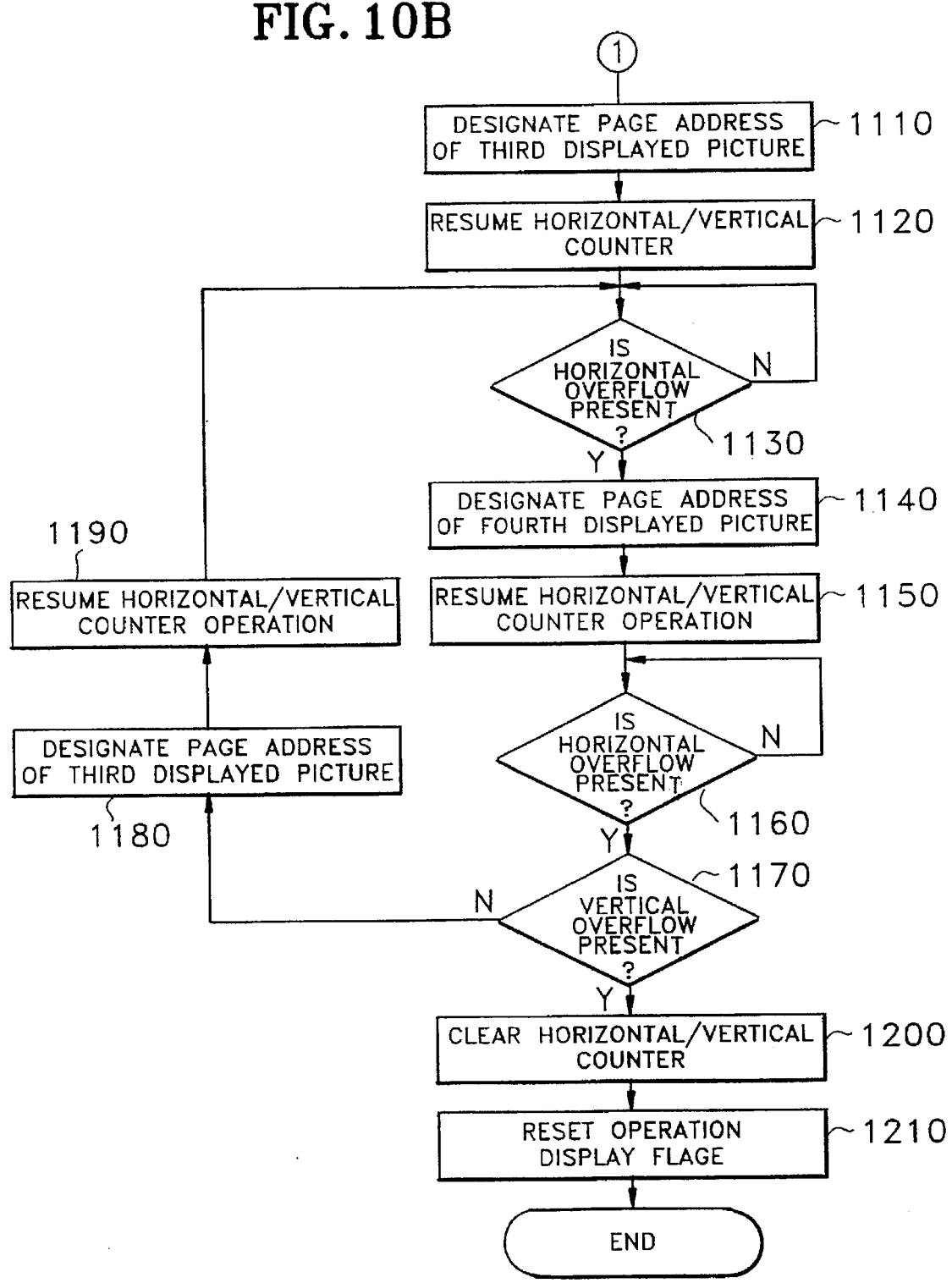

Referring to FIG. 10, when displaying four pictures on a screen, the reproducing buffer memory region is horizontally and vertically divided by 2 which requires horizontal and vertical data compression. The horizontal picture data compression is carried out by reading out one horizontal line of main memory 4 for every other pixel. An address value generated by the horizontal and vertical address generators of the four-picture address generator is supplied as a read address of main memory 4. The complete writing of the first horizontal line of the first picture data is recognized by detecting the falling edge of the MSB in horizontal address generator 144H of four-picture address generator 144. When an overflow signal is generated from horizontal address generator 144H of four-picture address generator 144, microcomputer 9 supplies a page address of the second picture data to the address bus of main memory 4 to read out and write the first horizontal line of the second picture's data. During the reading of the second picture, when an overflow signal is generated from horizontal address generator 144H of four-picture address generator 144, microcomputer 9 supplies the page address of the first picture to the address bus of main memory 4 to write and read out the next horizontal line of the first picture. The vertical compression of picture data is done by reading out every other horizontal line. A vertical address value generated from vertical address generator 144V of the four-picture address generator is supplied as a read address of the first and second picture data to main memory 4. When the final horizontal line of the first and second pictures is completely read out and written according to the process as above, microcomputer 9 supplies a page address of the third picture of data to the address bus of main memory 4 to read out and write the third and fourth pictures. The completion of the writing of the first and second pictures can be recognized by detecting the falling edge of the MSB of vertical address generator 144V of four-picture address generator 144. When an overflow signal is generated from vertical address generator 144V, microcomputer 9 supplies the page address of the third picture to the address bus of main memory 4 to read out and write the third picture.

First, step 1000 sets a flag which indicates that the reproducing buffer memory is writing according to the multi-picture controller 10. The flag is used when microcomputer 9 inspects whether or not multi-picture controller 10 is operating. Step 1010 supplies the page address of the first picture data to the address bus of main memory 4. Step 1020 resets horizontal and vertical counter 12 to initialize it. Step 1030 starts the reading out from main memory 4 and the writing into reproducing buffer memory 5 by operating horizontal and vertical counter 12. Step 1040 detects a horizontal overflow of four-picture address generator 144 to wait for the complete writing and reading of the first horizontal line of the first picture's data. After the complete writing and reading out of the first line of the first picture's data, step 1050 supplies a page address of the second picture to the address bus. Step 1060 writes and reads out the first horizontal line of the second picture by operating horizontal and vertical counter 12. Step 1070 detects horizontal overflow to wait for the complete writing of the first horizontal line of the second picture. After the complete writing of the first horizontal line of the second picture, step 1080 checks for the absence or presence of a vertical overflow signal. If the vertical overflow signal is not generated, step 1090 supplies a page address of the first picture to the address bus of main memory 4. Step 1100 resumes the operation of horizontal and vertical counter 12, and returns to step 1040 to detect the horizontal overflow: The reading out and writing up to the final horizontal line of the first and second pictures, are performed by repeating the steps 1040–1100. If the vertical overflow signal is detected in step 1080, step 1110 supplies a page address as the third picture's address to the address bus of main memory 4. The reading out and writing of the third and fourth pictures follow the same process as those of the first and second pictures, which are shown in steps 1120–1190 of FIG. 10. When a vertical overflow signal is detected in step 1170 after the writing of the final horizontal line of the fourth picture, the horizontal and vertical counter is cleared and the operation display flag is reset in steps 1200 and 1210, respectively, to end the four-picture control routine.

FIGS. 11A through 11F show the states of a picture displayed according to the present invention.

As described above in detail, the present invention is capable of displaying more than one picture at a time onto the picture display, thereby reducing the time to detect more than one picture's worth of data written in the main memory of an electronic still camera. Further, it is obvious that the multi-picture control circuit of the present invention can be applied to other apparatuses for storing picture data in a main memory such as a color video printer.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. In an electronic still camera which digitizes and stores a video signal representative of a plurality of pictures in a main memory and displays the video signal stored in said main memory on a screen, a multi-picture control circuit comprising:

picture selector means for enabling a user to make picture selection and to elect one of a selected single picture and selected different multiple pictures from said plurality of pictures stored in said main memory to be displayed on said screen of said electronic still camera, said selected different multiple pictures representing a combination of either two selected pictures, three selected pictures, four selected pictures, or up to N selected pictures to be simultaneously displayed on said screen, wherein N represents an integer greater than four;

microcomputer means responsive to said picture selector means, for identifying location of said one of said selected single picture and said selected different multiple pictures stored in said main memory; and multi-picture controller means comprising a plurality of multi-picture address generators for generating addresses of said one of said selected single picture and said selected different multiple pictures stored in said main memory under control of said microcomputer means to control the retrieval of said video signal stored in said main memory representative of said one of said selected single picture and said selected different multiple pictures for a visual display on said screen of said electronic still camera, said plurality of multi-picture address generators comprising:

a one-picture address generator for generating said addresses of said selected single picture stored in said main memory for a visual display on said screen of said electronic still camera;

a two-picture address generator for generating said addresses of said two selected pictures stored in said main memory for a visual display on said screen of said electronic still camera;

a three-picture address generator for generating said addresses of said three selected pictures stored in said main memory for a visual display on said screen of said electronic still camera;

a four-picture address generator for generating said addresses of said four selected pictures stored in said main memory for a visual display on said screen of said electronic still camera; and a N-picture address generator for generating said addresses of said N selected pictures stored in said main memory for a visual display on said screen of said electronic still camera.

2. The multi-picture control circuit as claimed in claim 1, wherein said multi-picture controller means further comprises:

a reproducing memory for temporarily storing the video signal representative of said one of said selected single picture and said selected different multiple pictures retrieved from said main memory;

a horizontal and vertical counter for designating one of said selected single picture and said selected different multiple pictures stored in said reproducing memory to be displayed on said screen in response to a clock signal;

a horizontal and vertical overflow detector for detecting an overflow of said horizontal and vertical counter;

a flip-flop for regulating said clock signal; and a multiplexer responsive to said microcomputer means, for selecting between said plurality of multi-picture address generators to provide said addresses corresponding to one of said selected single picture and said selected different multiple pictures to said main memory for retrieving said video signals representative of said one of said selected single picture and said selected different multiple pictures for a subsequent visual display on said screen of said electronic still camera.

3. The multi-picture control circuit as claimed in claim 1, wherein said addresses in correspondence with said one of said selected single picture and said selected different multiple pictures stored in said main memory are designated by a page address provided from said microcomputer means.

4. The multi-picture control circuit as claimed in claim 2, wherein said flip-flop resupplies said clock signal to said horizontal and vertical counter and said multi-picture address generators under control of said microcomputer means.

5. The multi-picture control circuit as claimed in claim 2, wherein each of said plurality of multi-picture address generators comprises:

means for generating said clock signal;

a multiplier for multiplying said clock signal;

a first counter connected to said multiplier, for providing even-numbered multiples of said clock signal;

a second counter for providing an integer value times said clock signal;

a first adder for adding outputs of said first and second counters;

a horizontal overflow detector for detecting a horizontal overflow of an output of said first adder;

a third counter connected to said multiplier, for providing even-numbered multiples of said clock signal;

a fourth counter for providing an integer value times said clock signal;

a second adder for adding outputs of said third and fourth counters;

a vertical overflow detector for detecting a vertical overflow of an output of said second adder; and an OR gate for OR-operating the outputs of said horizontal and vertical overflow detectors.

6. The multi-picture control circuit as claimed in claim 5, wherein said horizontal and vertical overflow detector of said multi-picture controller means detect said horizontal overflow and said vertical overflow by detecting an end of horizontal and vertical lines of the video signal stored in said main memory, respectively.

7. The multi-picture control circuit as claimed in claim 5, wherein said flip-flop receives the clock signal for driving said horizontal and vertical counter and said multi-picture address generators and, and interrupts the input of the clock signal to said horizontal and vertical counter and said multi-picture address generators upon detection of one of a horizontal overflow and a vertical overflow by said horizontal and vertical counter.

8. The multi-picture control circuit as claimed in claim 7, wherein said flip-flop resupplies the clock signal to said horizontal and vertical counter and said multi-picture address generators under control of said microcomputer means.

9. The multi-picture control circuit as claimed in claim 7, wherein said horizontal overflow detector clears said first and second counters after detecting said horizontal overflow.

10. The multi-picture control circuit as claimed in claim 7, wherein said vertical overflow detector clears said third and fourth counters after detecting said vertical overflow.

11. In a multi-picture control circuit for an electronic still camera which digitizes, stores a video signal representative of a plurality of pictures in a main memory and displays the stored video signal in correspondence with selected ones of said pictures on a screen, said multi-picture control circuit comprising:

a picture selector for, during a selection mode, enabling a user to make picture selection among said plurality of pictures to be displayed on said screen of said electronic still camera;

a microcomputer; and a multi-picture controller comprising separate and successively arranged one-picture, two-picture, three-picture, four-picture and up to N-picture address generators for, during said selection mode, generating read addresses of one of a selected single picture and selected different multiple ones of said plurality of pictures stored in said main memory under control of said microcomputer to retrieve picture data stored in said main memory representing one of said selected single picture and said selected different ones of said plurality of pictures into a reproducing buffer memory for a subsequent visual display on said screen of said electronic still camera, said selected multiple ones of said plurality of pictures representing a combination of either two selected pictures, three selected pictures, four selected pictures, or up to N selected pictures to be simultaneously displayed on said screen of said electronic still camera, wherein N represents an integer greater than four, and said multi-picture controller controlling said visual display of one of said selected single picture and said selected different multiple ones of said plurality of pictures stored in said main memory on said screen of said electronic still camera by:

operating in a normal mode when said selection mode has not been selected by the user, and interrupting an output from said reproducing buffer memory to said screen of said electronic still camera for a visual display when said selection mode has been selected by the user;

reading said picture data from said main memory and writing said picture data read from said main memory into said reproducing buffer memory in response to an instruction from said picture selector;

resuming the output from said reproducing buffer memory to said screen of said electronic still camera for said visual display upon completion of the writing of said picture data into said reproducing buffer memory;

waiting for a next instruction from said picture selector after providing said visual display of the output of said reproducing buffer memory on said screen of said electronic still camera; and erasing a currently displayed picture or different multiple ones of said plurality of pictures on said screen of said electronic still camera upon receipt of a completion signal, and returning to said normal mode.

12. The multi-picture control circuit as claimed in claim 11, wherein said picture selector designates page numbers in correspondence with one of said selected single picture and said selected different multiple ones of said plurality of pictures in said main memory, and said microcomputer counts the number of input pages to control said multi-picture controller to retrieve said picture data representative of one of said selected single picture and said selected different multiple ones of said plurality of pictures into said reproducing buffer memory.

13. The multi-picture control circuit as claimed in claim 11, wherein address designation of said picture data reproduced from said main memory is performed so that said microcomputer designates a page address and said multi-picture controller designates horizontal and vertical addresses in a page designated by said microcomputer.

14. A multi-picture control circuit in a camera for displaying, one or more pictures on a screen simultaneously, said multi-picture control circuit comprising:

main memory means for storing picture data representing a plurality of pictures in pages;

picture selection means for generating a picture control signal for making selection of one of a single picture and different ones of said plurality of pictures to be displayed on said screen of said camera;

reproducing buffer memory means for storing selected picture data reproduced from said main memory means representing one of a selected single picture and selected different ones of said plurality of pictures, said selected different ones of said plurality of pictures representing either two selected pictures, three selected pictures, four selected pictures, or up to N selected pictures to be simultaneously displayed on said screen, wherein said N represents an integer greater than four;

processing means for generating a processing control signal for controlling operation of said multi-picture control circuit; and multi-picture controlling means comprising separate and successively arranged one-picture, two-picture, three-picture, four-picture and up to N-picture address generators responsive to said processing control signal, for generating read addresses corresponding to one of said selected single picture and said selected different ones of said plurality of pictures representing either two selected pictures, three selected pictures, four selected pictures, or up to N selected pictures stored in said main memory means to retrieve said selected picture data representing one of said selected single picture and said selected different ones of said plurality of pictures into said reproducing buffer memory means for a subsequent visual display on said screen of said camera.

15. The multi-picture control circuit as claimed in claim 14, further comprising:

video input means for receiving an analog video signal representative of a picture taken from an object;

first converting means for converting said analog video signal to digital video data;

buffer memory means for storing said digital video data as said picture data, and for supplying said picture data to said main memory means; and second converting means for converting said picture data reproduced from said reproducing buffer memory means to a processed analog video signal.

16. The multi-picture control circuit as claimed in claim 14, wherein said multi-picture controlling means further comprises:

multiplexing means for selectively transmitting said read addresses representing main memory horizontal addresses and main memory vertical addresses generated from said separate and successively arranged one-picture, two-picture, three-picture, four-picture and up to N-picture address generators to said main memory means for retrieval of said selected picture data representing one of said selected single picture and said selected different ones of said plurality of pictures into said reproducing buffer memory means;

address counter means for generating reproducing buffer horizontal addresses and said reproducing buffer vertical addresses to said reproducing buffer memory means for reproduction of said selected picture data representing one of said selected single picture and said selected different ones of said plurality of pictures to be displayed on said screen;

address overflow detection means for detecting an overflow in said address counter means; and flip-flop means for controlling a clock signal to said address counter means.

17. The multi-picture control circuit as claimed in claim 14, wherein said picture selection means further comprises:

means for designating a selection mode for enabling a user to make picture selection and elect one of said selected single picture and said selected different ones of said plurality of pictures representing either two selected pictures, three selected pictures, four selected pictures or up to N selected pictures to be displayed on said screen of said camera; and means for designating the page of one of said selected single picture and said selected different ones of said plurality of pictures to be displayed on said screen of said camera.

18. The multi-picture control circuit as claimed in claim 16, wherein said address counter means synchronizes the generation of said reproducing buffer horizontal addresses, reproducing buffer vertical addresses, main memory horizontal addresses, and main memory vertical addresses.

19. The multi-picture control circuit as claimed in claim 16, wherein said address overflow detection means detects an overflow by inspecting the most-significant-bit of said address counter means, thus indicating the end of writing picture data to said reproducing buffer memory means, said address overflow detection means also supplying an address overflow signal to said processing means.

20. The multi-picture control circuit as claimed in claim 16, wherein said flip-flop means receives said clock signal for driving said address counter means and said separate and successively arranged one-picture, two-picture, three-picture, four-picture and up to N-picture address generators, and when said address overflow detection means detects an overflow in said address counter means, said flip-flop means interrupts the clock signal from being received by said address counter means and said separate and successively arranged one-picture, two-picture, three-picture, four-picture and up to N-picture address generators.

21. The multi-picture control circuit as claimed in claim 16, wherein said processing means produces a clock resupply signal in response to an overflow detected by said address overflow detection means.

22. The multi-picture control circuit as claimed in claim 21, wherein said flip-flop means resupplies said clock signal to said address counter means in response to said clock resupply signal.

23. The multi-picture control circuit as claimed in claim 16, wherein each of said separate and successively arranged one-picture, two-picture, three-picture, four-picture and up to N-picture address generators comprises:

horizontal generator means for producing said main memory horizontal addresses;

vertical generator means for producing said main memory vertical addresses; and logic means for selectively passing said main memory horizontal addresses and said main memory vertical addresses to said main memory means.

24. The multi-picture control circuit as claimed in claim 23, wherein:

said horizontal generator means comprises:

horizontal counting means for providing multiples of an input clock to produce said main memory horizontal addresses; and horizontal overflow detection means for checking for an overflow of said main memory horizontal addresses; and said vertical generator means comprises:

vertical counting means for providing multiples of the input clock to produce said main memory vertical addresses; and vertical overflow detection means for checking for an overflow of said main memory vertical addresses.

25. The multi-picture control circuit as claimed in claim 24, wherein:

said horizontal counting means comprises:

first counting means for providing an even numbered multiple of the input clock; second counting means for providing an integer value times the input clock;

first multiplying means, for providing an even numbered multiple of the input clock to said first counting means;

first adding means for adding signals received from said first counting means and said second counting means; and said vertical counting means comprises:

third counting means for providing an even numbered multiple of the input clock;

fourth counting means for providing an integer value times the input clock;

second multiplying means, for providing an even numbered multiple of the input clock to said third counting means;

second adding means for adding signals received from said third counting means and said fourth counting means.

26. The multi-picture control circuit as claimed in claim 24, wherein said horizontal overflow detection means and said vertical overflow detection means detect an overflow in said horizontal counting means and said vertical counting means, respectively, thus indicating the end of reading horizontal and vertical components, respectively, of a given picture data from said main memory means, said horizontal overflow detection means and said vertical overflow detection means supplying a detected overflow signal to said processing means.

27. The multi-picture control circuit as claimed in claim 26, wherein said processing means supplies a page address of a new picture to said main memory means in response to said detected overflow signal, and produces a staff signal to clear said flip-flop means, said horizontal overflow detection means, and said vertical overflow detection means.

28. An electronic picture-taking method, comprising:

storing in a main memory a plurality of pictures taken by an electronic picture-taking device;

storing a reproducing buffer memory picture data corresponding to one of a selected single picture and selected different ones of said plurality of pictures reproduced from said main memory;

generating picture addresses with a multi-picture controller comprising separate and successively arranged one-picture, two-picture, three-picture, four-picture and up to N-picture address generators generating said picture addresses of one of said selected single picture and said selected different ones of said plurality of pictures stored in said main memory to be reproduced into said reproducing buffer memory for a subsequent visual display on a screen of the electronic picture-taking device; and controlling said visual display of one of said selected single picture and said selected different ones of said plurality of pictures by the steps of:

operating in a normal mode, when a selection mode has not been selected by a user, and interrupting transmission of picture data from said reproducing buffer memory to said screen of said electronic picture-taking device for a visual display, when said selection mode has been selected by said user;

reading said picture data corresponding to one of said selected single picture and said selected different ones of said plurality of pictures from said main memory to be displayed on said screen of said electronic picture-taking device, and writing said picture data into said reproducing buffer memory, said selected different ones of said plurality of pictures representing either two selected pictures, three selected pictures, four selected pictures, or up to N selected pictures to be simultaneously displayed on said screen of said electronic picture-taking device, wherein said N represents an integer greater than four;

resuming the transmission of said picture data from said reproducing buffer memory to said screen of said electronic picture-taking device for said visual display of said picture data corresponding to one of said selected single picture and said selected different ones of said plurality of pictures on said screen after the completion of writing said picture data from said main memory into said reproducing buffer memory; and erasing a currently displayed single picture or different ones of said plurality of pictures on said screen of said electronic picture-taking device upon receipt of a completion signal, and returning to said normal mode.

29. The multiple picture display method as claimed in claim 28, wherein said step of operating in the normal mode and interrupting the writing of picture data further comprises:

determining whether a end-of-detection instruction is received from a picture selector for during said selection mode enabling the user to make picture selection from said plurality of pictures to be displayed on said screen of said electronic picture-taking device;

checking whether picture formation is performed by a previous selection mode when the end-of detection instruction is not received from said picture selector;

stopping the writing of picture data from said main memory to said reproducing buffer memory when said picture formation is being performed;

converting a total number of pages representing one of said selected single picture and selected different ones of said plurality of pictures to be displayed on said screen into a page address, when the end-of-detection instruction is not received from said picture selector; and providing said page address to store said picture data corresponding to one of said selected single picture and said selected different ones of said plurality of pictures to be displayed on said screen, when the end-of-detection instruction is transmitted from said picture selector.

30. The multiple picture display method as claimed in claim 28, wherein said step of reading said picture data from said main memory and writing said picture data into said reproducing buffer memory comprises:

setting an operation display flag to indicate whether said multi-picture controller is in operation;

supplying a page address of said picture data corresponding to one of said selected single picture and said selected different ones of said plurality of pictures to an address bus of said main memory;

compressing said picture data and storing compressed picture data in the reproducing buffer memory; and resetting the operation display flag.

31. The multiple picture display method as claimed in claim 30, wherein said step of compressing said picture data and storing the compressed data in the reproducing buffer memory comprises:

counting an input clock depending on the number of pictures to be displayed on said screen to generate horizontal and vertical addresses of said main memory;

reading horizontal line picture data based on the generated horizontal addresses until a horizontal overflow is detected;

incrementing the vertical address of said main memory based on the generated vertical addresses; and supplying a page address of said picture data corresponding to a next picture from said selected different ones of said plurality of pictures to an address bus of said main memory when more than one picture is to be displayed on said screen.

32. The multiple picture display method as claimed in claim 28, wherein said step of reading said picture data from said main memory and writing said picture data into said reproducing buffer memory for a visual display of said selected single picture comprises:

setting an operation display to indicate whether said multi-picture controller is operation;

supplying a page address of said picture data corresponding to said single selected picture to an address bus of said main memory;

clearing an address counter that generates horizontal and vertical addresses of said reproducing buffer memory;

reading said picture data corresponding to said selected single picture from said main memory and counting the horizontal and vertical addresses of said reproducing buffer memory;

checking whether there is an overflow of the address counter;

clearing the address counter after an overflow occurs; and resetting the operation display flag.

33. The multiple picture display method as claimed in claim 28, wherein said step of reading said picture data from said main memory and writing said picture data into said reproducing buffer memory for a visual display of said selected different ones of said plurality of pictures representing two selected pictures comprises:

setting an operation display to whether said multi-picture controller is operation;

supplying a page address of said picture data corresponding to a first selected picture to an address bus of said main memory;

clearing an address counter that generates horizontal and vertical addresses of said reproducing buffer memory;

reading said picture data corresponding to said first selected picture from said main memory and counting the horizontal and vertical addresses of said reproducing buffer memory;

checking whether there is a vertical overflow from said multi-picture controller, thus waiting for the completion of the writing of said picture data corresponding to said first selected picture to said reproducing buffer memory;

supplying a page address of said picture data corresponding to a second selected picture to an address bus of said main memory;

resuming the count of the address counter;

checking whether there is a vertical overflow from said multi-picture controller, thus waiting for the completion of the writing of said picture data corresponding to said second selected picture to said reproducing buffer memory;

clearing the address counter after an overflow occurs; and resetting the operation display flag.

34. A camera, comprising:

a main memory comprising a plurality of pages each storing picture data representative of a corresponding one of a plurality of pictures;

picture selector means for enabling a user to select one of a single selected picture and different plurality of selected pictures among said plurality of pictures stored in said main memory, to be displayed on a screen of said camera;

a buffer memory for temporarily storing picture data in correspondence with either one of said single selected picture and said different plurality of selected pictures, read from said main memory, for a visual display on said screen of said camera;

processor means for generating page addresses to identify the pages within said main memory storing said picture data in correspondence with one of said single selected picture and said different plurality of selected pictures; and multi-picture controller means having a plurality of picture address generators for generating picture addresses corresponding to said page addresses to retrieve said picture data of one of said single selected picture and said different plurality of selected pictures from said main memory into said buffer memory, said multi-picture controller means further generating buffer addresses for reading said picture data of one of said single selected picture and said different plurality of selected pictures temporarily stored in said buffer memory for a visual display on said screen of said camera, said plurality of picture address generators respectively representing a one-picture address generator for generating said picture addresses of said single selected picture to be displayed on said screen, a two-picture address generator for generating said picture addresses of two selected pictures to be simultaneously displayed on said screen, a three-picture address generator for generating said picture addresses of three selected pictures to be simultaneously displayed on said screen, a four-picture address generator for generating said picture addresses of four selected pictures to be simultaneously displayed on said screen, and up to a N-picture address generator for generating said picture addresses of N-pictures to be simultaneously displayed on said screen, wherein N represents an integer greater than four.

35. The camera as claimed in claim 34, wherein said main memory contains sixteen pages in correspondence with sixteen pictures and said different plurality of selected pictures represent a combination of either said two selected pictures, said three selected pictures, said four selected pictures or up to said N selected pictures, wherein N represents an integer greater than four but no greater than sixteen.

36. The camera as claimed in claim 34, wherein said multi-picture controller means further comprises:

multiplexer means, responsive to said processor means, for providing a selected output from said plurality of picture address generators as said picture addresses;

counter means for designating said read addresses in correspondence with said one of said single selected picture and said different plural ones of selected pictures stored in said buffer memory to be displayed on said screen in response to a clock signal;

overflow detector means for detecting an overflow of said counter means; and flip-flop means for controlling transmission of said clock signal.

37. The camera as claimed in claim 34, wherein said each of said plurality of multi-picture address generators comprises:

means for generating said clock signal;

a first multiplier for multiplying said clock signal;

a first counter connected to said first multiplier, for providing even-numbered multiples of said clock signal;

a second counter for providing a first integer value times said clock signal;

a first adder for adding outputs of said first and second counters to provide a horizontal address;

a horizontal overflow detector for detecting a horizontal overflow of an output of said first adder;

a third counter connected to said multiplier, for providing even-numbered multiples of said clock signal;

a fourth counter for providing a second integer value times said clock signal;

a second adder for adding outputs of said third and fourth counters to provide a vertical address, said vertical address and said horizontal address representing said picture address for identifying and reproducing said picture data in correspondence with either one of said single selected picture and said different plurality of selected pictures from said main memory into said buffer memory;

a vertical overflow detector for detecting a vertical overflow of an output of said second adder; and an OR gate for OR-operating the outputs of said horizontal and vertical overflow detectors to disable the generation of said clock signal.

* * * * *